April 6, 1926.
C. A. FISHER ET AL
1,580,029
AUTOMATIC INDEXING MECHANISM
Filed Nov. 20, 1922      3 Sheets-Sheet 1.
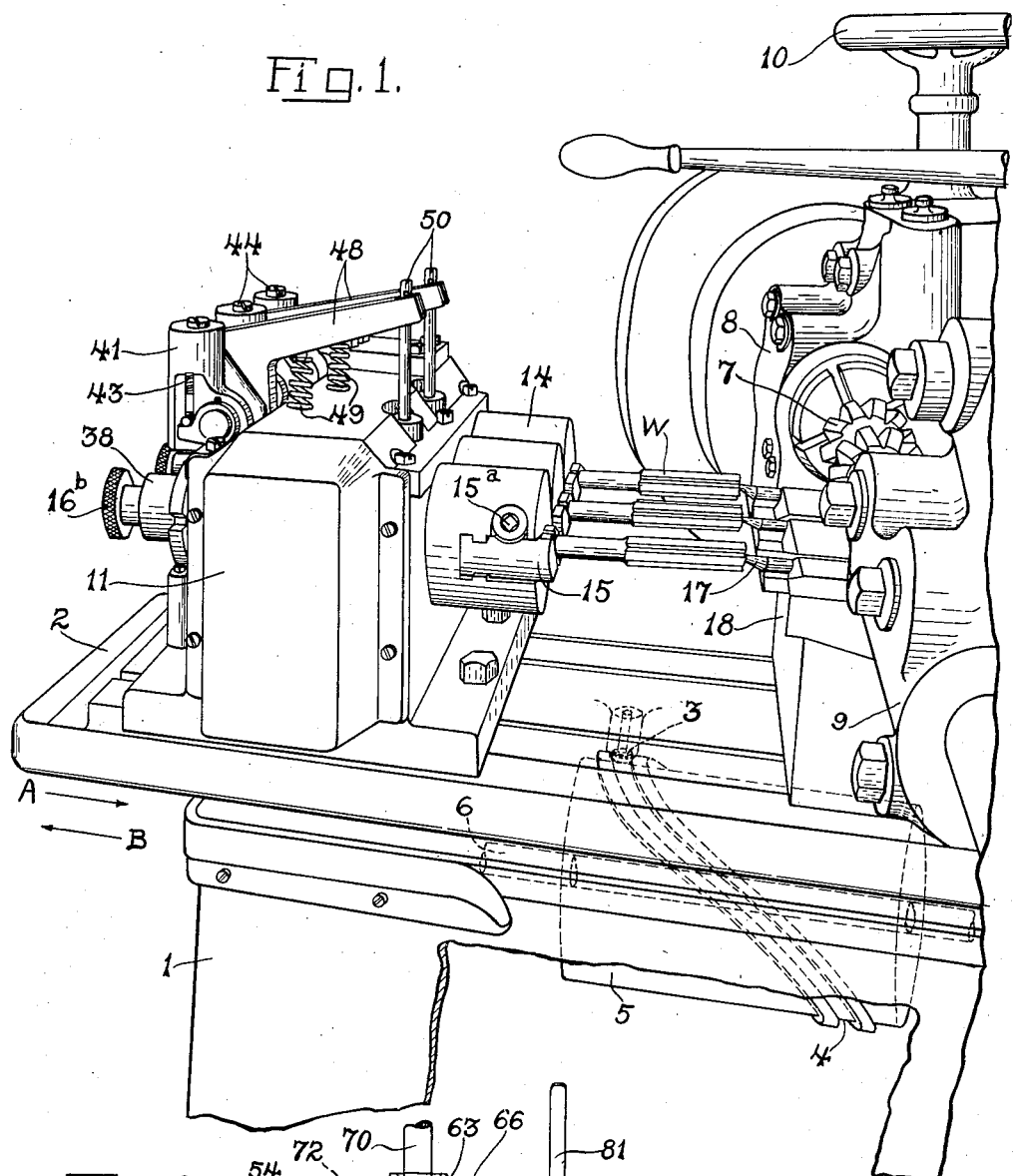
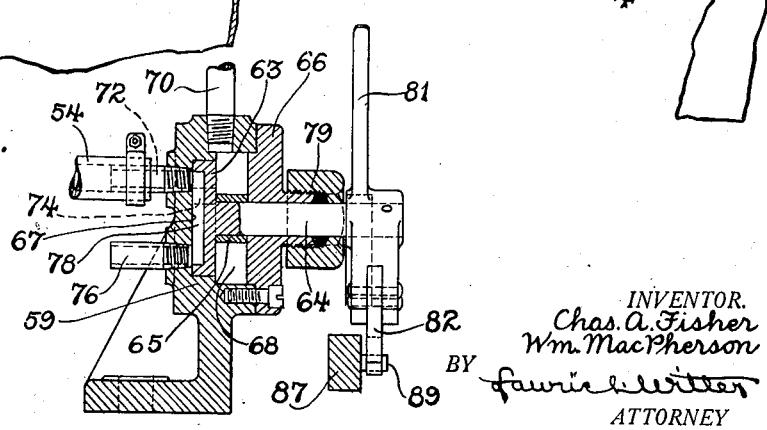
INVENTOR.
Chas. A. Fisher
Wm. MacPherson
BY
ATTORNEY April 6, 1926.  
C. A. FISHER ET AL  
1,580,029  
AUTOMATIC INDEXING MECHANISM  
Filed Nov. 20, 1922   3 Sheets-Sheet 2
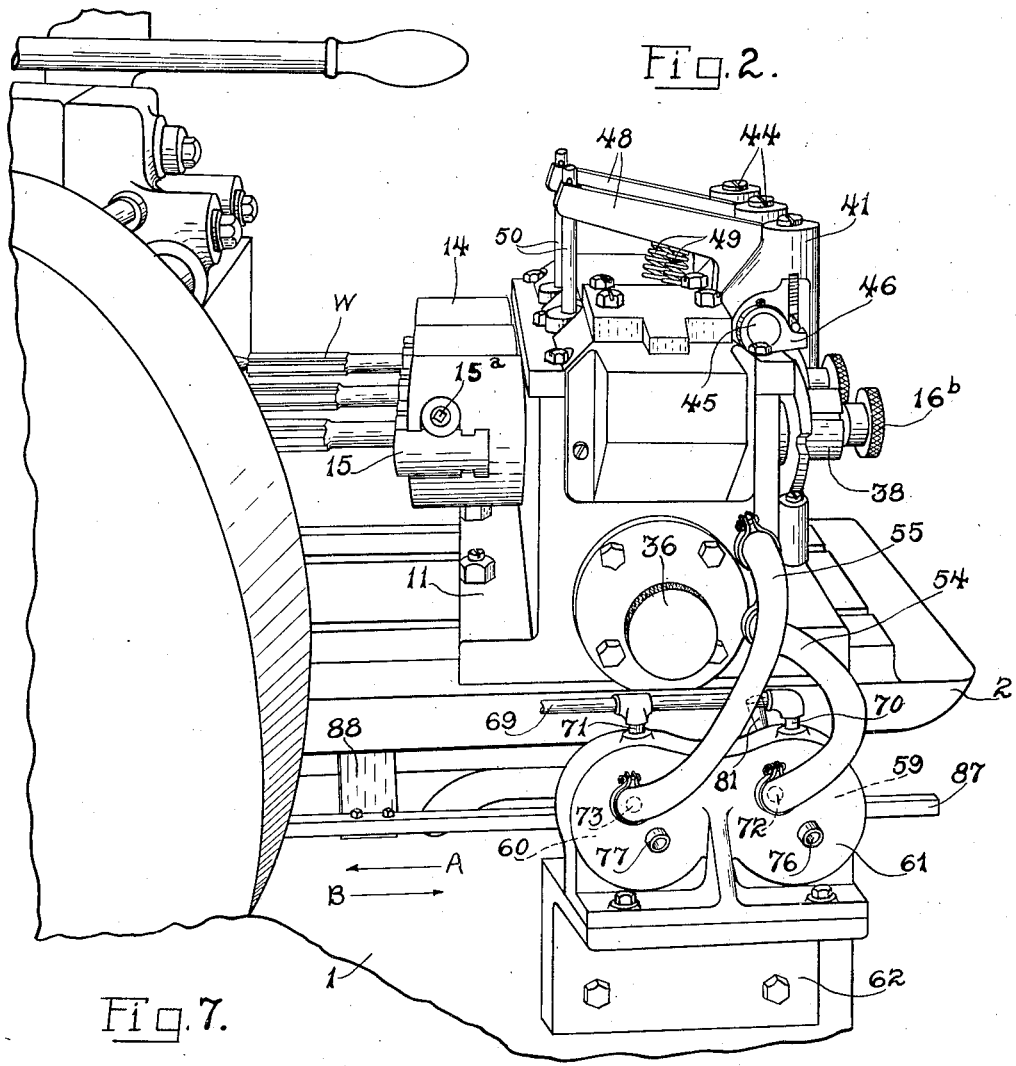
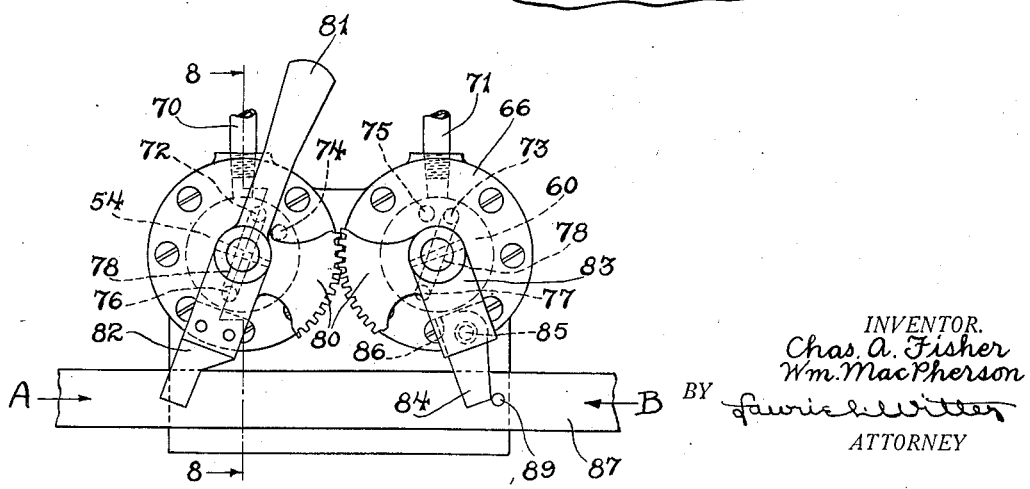
INVENTOR.  
Chas. A. Fisher  
Wm. MacPherson  
BY Laurie L. Witter  
ATTORNEY April 6, 1926.

C. A. FISHER ET AL

AUTOMATIC INDEXING MECHANISM

Filed Nov. 20, 1922    3 Sheets-Sheet 3

1,580,029

INVENTOR.
Chas. A. Fisher
Wm. MacPherson
BY
ATTORNEY

Patented Apr. 6, 1926.

1,580,029

UNITED STATES PATENT OFFICE.

CHARLES A. FISHER AND WILLIAM MacPHERSON, OF DUNDAS, ONTARIO, CANADA, ASSIGNORS TO NILES-BEMENT-POND COMPANY, OF NEW YORK, N. Y., A CORPORATION OF NEW JERSEY.

AUTOMATIC INDEXING MECHANISM.

Application filed November 20, 1922. Serial No. 602,248.

*To all whom it may concern:*

Be it known that we, CHARLES A. FISHER and WILLIAM MACPHERSON, subjects of the King of Great Britain, residing at Dundas, in the Province of Ontario and Dominion of Canada, have invented certain new and useful Improvements in Automatic Indexing Mechanisms, of which the following is a specification.

This invention relates to automatic indexing mechanisms or fixtures and particularly to such a mechanism in connection with a metal working machine, as the milling machine shown in the accompanying drawings. In such drawings the fixture is illustrated as mounted on a reciprocating work table and provided with a plurality of work supporting spindles therein. A plurality of rotary tools are also provided for operating on work pieces carried by the spindles. Fluid pressure operated means, to be hereinafter specifically described, is also further provided on the fixture for simultaneously indexing the spindles, the said means being operated in timed relation with the table reciprocation. The primary object of the invention is to provide an improved indexing mechanism of this type.

It is an object of the invention to provide an indexing fixture comprising a headstock supporting one or a plurality of work spindles therein, and means on the headstock including a longitudinally movable fluid operated piston operatively connected to the spindles for indexing the same.

It is an object of the invention to provide a mechanism of the above type with means for locking the spindles against rotation and means including valve controlling mechanism operated synchronously with the relative reciprocation between the spindles and tools for releasing the locking means and thereafter admitting fluid pressure to the said piston for indexing the spindles through a desired angle.

A further object of the invention is to provide a mechanism of the type shown in the drawings and just described with latch means for preventing rotation of the spindles, fluid pressure operated means for disengaging the latch means, and a pair of valves controlled by the table reciprocation, one of the valves operating to first admit fluid pressure to disengage the latch means and the other valve thereafter admitting fluid pressure to index the spindles through a desired angle.

Another object of the invention is to provide an indexing fixture having a plurality of work supporting spindles with a work engaging center in each, in combination with means for indexing the spindles and means for withdrawing the centers to permit the insertion and removal of the work pieces.

With the above and other objects in view, our invention consists in the features of construction and operation set forth in the following specification and illustrated in the accompanying drawings. In such drawings annexed hereto and forming a part of this specification, we have shown our invention embodied in a milling machine but it will be understood that the invention can be otherwise embodied and that the drawings are not to be construed as defining or limiting the scope of the invention, the claims appended to this specification being relied upon for that purpose.

Referring to the figures of the drawings:

Figure 1 is a perspective front view of a milling machine provided with our improved indexing fixture.

Fig. 2 is a rear perspective view of the same.

Fig. 7 is a rear elevation of the valves for controlling the operation of the fixture.

Fig. 8 is a sectional view through one valve on line 8—8 of Fig. 7.

Figure 3:
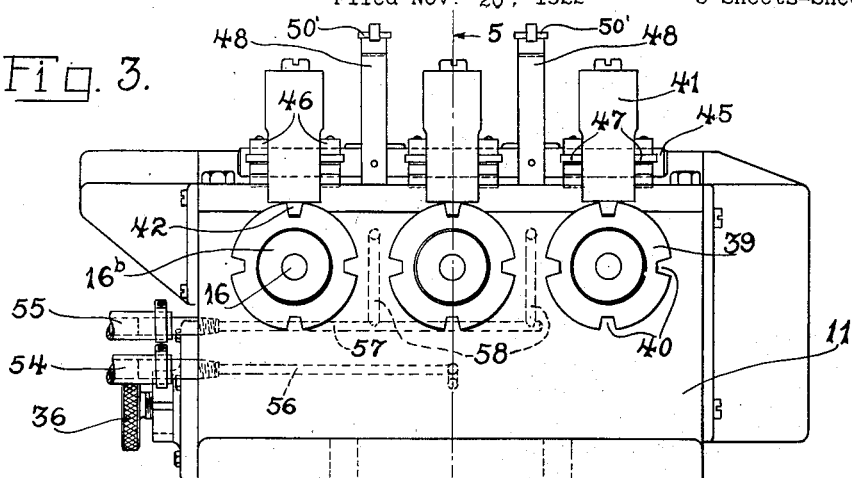
Fig. 3 is an end elevation of the fixture.

In the accompanying drawings we have illustrated our improved indexing mechanism in connection with a milling machine. The indexing fixture, illustrated as mounted on a reciprocating work table, has mounted therein a plurality of work spindles and each of such spindles is illustrated as supporting a work piece. The operation to be performed comprises the milling of a plurality of longitudinal grooves or flutes in each work piece by the rotary milling cutters illustrated. The fixture comprises locking means for holding each spindle and its work piece against rotation during the milling operation and fluid pressure operated means, hereinafter described, for thereafter releasing the spindle locking means and simultaneously indexing all the spindles through the proper angle to position the work piece for the next grooving cut. As hereinafter described, the fluid pressure for operating the releasing and indexing mechanisms is controlled by the table reciprocation whereby the indexing of the spindles and work takes place automatically while the work is positioned away from the tools, as illustrated in Fig. 1.

Referring more specifically to the drawings by reference characters, 1 indicates the frame of a milling machine having a work table 2 slidably mounted thereon. A roller 3 secured to the underside of the table rides in a cam groove 4 of a barrel cam 5 on a shaft 6 whereby the table is reciprocated. A plurality of milling cutters 7 are carried on a cutter spindle rotatably supported in bearings in the headstock 8 and footstock 9 of the machine. The cutters may be adjusted vertically toward and from the table by means of a hand wheel 10. The milling machine as thus far described is the same as that illustrated and described in Patent No. 1,177,569 to B. M. W. Hanson.

Our improved indexing fixture includes a headstock 11 illustrated as bolted to one end of the work table 2. Three work carrying spindles 12 are rotatably mounted in the headstock, each spindle having a work engaging center 13 and a chuck 14 on one end thereof. Each chuck is adapted to grip its work piece W by means of a pair of jaws 15 operated by a screw 15ᵃ. The other end of each work piece W is supported by a center 17 mounted in a tailstock 18 secured to the work table.

In fixtures of the type illustrated, the work pieces W are ordinarily inserted and removed by withdrawing the tailstock centers 17. Such operation, however, requires the operator to reach over the cutters 7 which is not only awkward and inconvenient but dangerous to the operator. For these reasons, we desire to so construct our fixture that the headstock centers 13 may be withdrawn, thereby avoiding the chance of injury to the operator and rendering the mechanism more convenient in operation. Accordingly, each center 13 is slidably mounted within its spindle 12. A screw 16 threaded axially into each center 13 is held against axial movement in its spindle by means of a flange 16ᵃ thereon between the rear end of the spindle and a nut 38 threaded thereto. The screw 16 may be rotated to move the center 13 axially by means of a knurled knob 16ᵇ pinned to the rear end of the screw.

Figure 4:
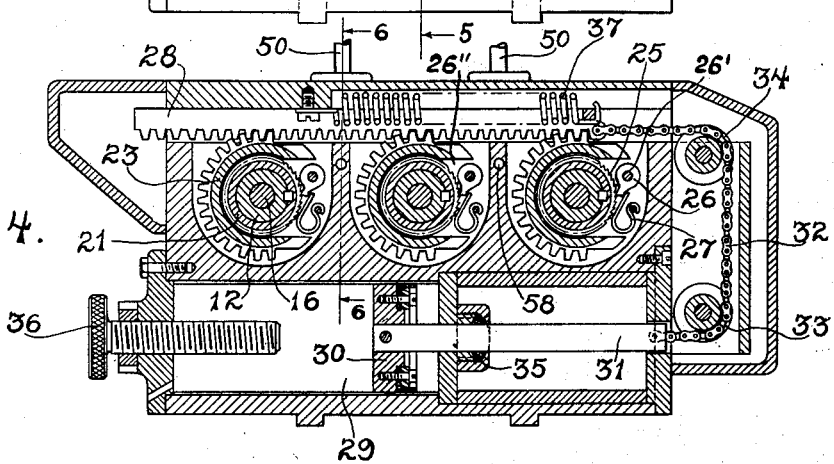
Fig. 4 is a cross sectional view therethrough on line 4—4 of Fig. 5.
Figure 5:
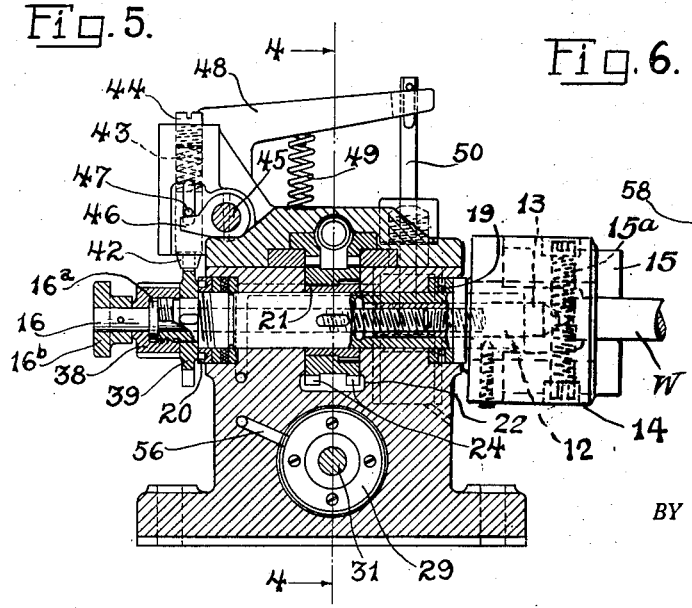
Fig. 5 is a longitudinal sectional view through the fixture on line 5—5 of Fig. 3.
Figure 6:
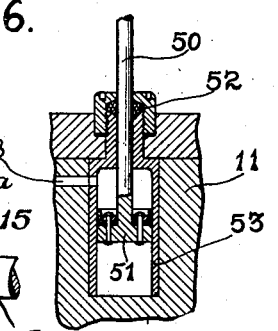
Fig. 6 is a detail sectional view through a latch releasing cylinder on line 6—6 of Fig. 4.

As shown in Fig. 5, each spindle is supported in the headstock between a ball-bearing 19 adjacent one end of the spindle and a nut 20 threaded to the other end thereof. A bushing 21 is keyed to each spindle within a recess 22 in the headstock. Rotatably mounted on each bushing 21 is a pinion or pinion segment 23 having laterally spaced teeth 24. Each bushing 21 is provided with ratchet teeth 25 on one end thereof to be engaged by a pawl 26 pivoted at 26′ to the pinion 23 within a recess 26″ therein and held in engagement with the ratchet teeth by means of a spring 27. A rack 28 slidably mounted in the headstock is in meshing engagement with the pinions 23 as illustrated in Figs. 4 and 5.

A cylinder 29 is formed within the headstock beneath and transversely of the spindles 12. A piston 30 operative within the cylinder is operatively connected to the rack 28 by means of a piston rod 31 and a chain 32, the chain passing over pulleys 33 and 34. The piston rod extends through a stuffing box 35 formed in one end of the cylinder. An adjustable screw 36 threaded into the other end of the cylinder is adapted to limit the movement of the piston as hereinafter described. Movement of the piston toward the screw 36 is adapted to move the rack 28 in the spindle indexing direction and a spring 37 secured at one end to the headstock and at its other end to the rack is adapted to move the rack in the opposite or idle direction.

When milling straight flutes or grooves in the work piece, as illustrated in Figs. 1 and 2, it is necessary that the work pieces be held against rotation during the milling operation. We prefer, as illustrated in the drawings, to provide a latch adjacent each spindle for performing this function. Keyed to each spindle and between the nut 20 and a nut 38 threaded to the end of the spindle, is a disk 39 provided with spaced notches 40. Slidably mounted over each disk within a housing 41 on the headstock is a detent or latch 42 having its lower end bevelled to engage within one of the notches 40. A compression spring 43 between each detent and a threaded plug 44 normally forces each detent into engagement with the disk 39.

A shaft 45 extending transversely past the detents 42 is provided with a pair of arms 46′ pinned thereto on opposite sides of each detent. A pair of pins 47 on each detent is adapted to be engaged by these arms to release the detent as hereinafter described. Secured to the shaft 45 between the housings 41 is a pair of levers 48 normally held in their upward position by means of springs 49. The outer end of each lever is engaged by a pin 50' seated in the upper end of a piston rod 50 extending upwardly from the piston 51. Each piston rod extends through a stuffing box 52 and its piston is operative within a vertically extending cylinder 53 in the headstock.

The indexing piston 30 and the detent latch releasing pistons 51 are preferably operated by compressed air. Inlet delivery pipes or tubes for supplying air to the pistons 29 and 51 are respectively indicated by numerals 54 and 55 (Fig. 3). Air from the pipe 54 passes through a duct 56 in the headstock directly into the forward end of the cylinder 28 as indicated in Figs. 3, 4 and 5. Air from the pipe 55 passes through a duct 57 in the headstock and branch ducts 58 into the forward end of the two cylinders 53 as indicated in Figs. 3 to 6. The means for automatically controlling the supply of air to these cylinders synchronously with the table reciprocation will now be described.

A pair of rotary valves 59 and 60 are mounted in a casing 61 supported on a bracket 62 at the rear side of the machine. As illustrated clearly in Fig. 2, the valve 59 controls the air to the indexing cylinder 29 and the valve 60 controls the air to the latch releasing cylinders 53. The pipes or tubes 54 and 55 are flexible whereby to permit the reciprocation of table 2.

As shown in Figs. 7 and 8, each valve comprises a disk 63 having a stem or shaft 64 integral therewith. A bushing 65 on the stem between the disk and the cover plate 66 holds the face of the disk in contact with the inner face 67 of the casing and provides an air chamber 68 in each valve. Air is supplied to the valves from the pipe 69 leading into the valves at 70 and 71. Delivery ports 72 and 73 are provided through the front wall of the casing 61 leading respectively into the flexible tubes 54 and 55. Holes 74 and 75 through the valve disks in the valves 59 and 60 respectively provide a communication between the chambers 68 and the delivery ports 72 and 73 as hereinafter described. Exhaust ports 76 and 77 are also provided through the front wall of the casing 61. A diametrically extending recess 78 formed in the front wall of each disk 63 provides a communication between the delivery ports 72 and 73 and the exhaust ports 76 and 77 respectively as illustrated in Fig. 7.

The valve stems 64 pass through stuffing boxes 79 and have intermeshing gear segments 80 on the outer ends thereof. The stem of valve 59 is also provided with an operating handle 81 and a downwardly depending arm 82. The stem of valve 60 is provided with a downwardly depending arm 83 and a finger 84 pivoted thereto at 85. The finger is free to swing about its pivot to the right (Fig. 7) but cannot swing to the left because of the shoulder 86 thereon. A rod 87 secured to the table 2 by means of a plate 88 has a pin 89 therein adapted to engage the finger 84 and the arm 82 to operate the valves as hereinafter described.

Briefly, the operation of the machine is as follows: Assuming that the several work pieces have been chucked as illustrated in the drawings and that the table is in its forward position ready for the first cutting stroke thereon, the operator starts the machine and the table moves in the cutting direction, indicated by the arrow A. The work pieces thereby pass under the milling cutters 7 whereby the first groove or flute is formed in each piece. Upon the reverse movement of the table, indicated by the arrow B, the work pieces pass idly beneath the cutters in the usual manner. The pin 89 is so positioned in the rod 87 that it engages the finger 84 after the work pieces have passed beyond and free of the cutters. This position is shown in Figs. 2 and 7 and the rod is moving with the table in the direction indicated by the arrow B. Continued movement of the rod rotates the stem 64 and disk 63 of valve 60 clockwise (Fig. 7) and that of the valve 59 anticlockwise. The recesses 78 of the disks are therefore moved out of registry with the delivery ports 72 and 73 and the holes 74 and 75 through the disks are moved into registry with such ports, thus providing a communication between the chambers 68 and the flexible tubes 54 and 55.

It will be noted (Fig. 7) that the hole 75 is positioned slightly closer to the recess 78 in its disk than is the hole 74 to the recess 78 in its disk. For this reason, air is admitted to the tube 55 slightly in advance of the admission of air into the tube 54.

The air admitted to the tube 55 passes into the cylinders 53 whereby the pistons 51 are drawn downwardly. Through the levers 48, rock shaft 45 and the other connections heretofore described, the spindle locking latches or detents 42 are withdrawn thus releasing the spindles for the indexing operation. The air admitted to the tube 54 thereafter passes into the cylinder 28 and moves the piston 29 toward the stop screw 36 which has previously been adjusted to limit the movement of the piston. This movement of the piston operates through the chain 32, rack 28 and the pinions 23, heretofore described, to rotatably index the spindles through the desired angle. As illustrated in the drawing, this angle is 90° since there are four notches 40 in the spindle locking disks 39. It will be understood, however, that the spindles may be indexed to any angle and locked in such indexed position by substituting disks having the required number of notches therein for the disks 39 and adjusting the screw 36 to correspond therewith.

Upon the continued movement of the table 2 and rod 87 in the same direction, arrow B, the pin 89 strikes the arm 82 and rotates the valves in the opposite direction, to the position illustrated in Fig. 7. Communication between the chambers 68 and the tubes 54 and 55 is thereby cut off and the tubes are placed in communication with the exhaust ports 76 and 77 through the recesses 78. The air is therefore permitted to exhaust from the cylinders 29 and 53 whereby the springs 43 and 49 move the detents 42 into their respective notches 40, thus locking the spindles against rotation and the spring 37 moves the rack 28 back to its original position, the pinions 23 latching idly over the bushings 21. The mechanism is now in position for the next cutting stroke. Upon the forward movement of the table, arrow A, the pin 89 is permitted to move past the finger 84 since the latter is free to swing to the right (Fig. 7) about its pivot 85.

What we claim is:

1. In combination, a headstock, a plurality of work spindles therein, means including a longitudinally movable fluid operated piston on the headstock operatively connected to the spindles for indexing the same, and adjustable means for limiting the movement of the piston in the spindle indexing direction.

2. In combination, a headstock, a plurality of work spindles therein, means including a longitudinally movable fluid operated piston on the headstock operatively connected to the spindles for indexing the same, and screw threaded means on the headstock for limiting the movement of the piston in the spindle indexing direction.

3. In combination, a headstock, a plurality of work spindles therein, a pinion on each spindle, a rack operatively connected to the pinions, a longitudinally movable fluid operated piston on the headstock operatively connected to the rack for moving the same in the spindle indexing direction, and a spring connected to the rack for moving the same in the opposite direction.

4. In combination, a headstock, a plurality of work spindles therein, releasable locking means on the headstock for preventing rotation of the spindles, spring means for engaging the locking means to lock the spindles, means comprising a longitudinally movable fluid operated piston on the headstock operatively connected to the spindles for indexing the same, and means operative against the spring means to release the locking means prior to the indexing operation.

5. In combination, a headstock, a plurality of work spindles therein, releasable latch means on the headstock for preventing rotation of the spindles, spring means for engaging the latch means to lock the spindles, fluid operated piston means on the headstock for releasing the latch means, and means comprising a longitudinally movable fluid operated piston on the headstock operatively connected to the spindles for indexing the same.

6. In combination, a headstock, a plurality of work spindles therein, releasable latch means on the headstock for preventing rotation of the spindles, fluid operated piston means on the headstock for releasing the latch means, a pinion on each spindle, a rack operatively connected to the pinions, a longitudinally movable fluid operated piston on the headstock operatively connected to the rack for moving the same in the spindle indexing direction, and a spring connected to the rack for moving the same in the opposite direction.

7. In combination, a work spindle, a rotary tool adapted to engage a work piece carried by the spindle, means providing a relative reciprocation between the spindle and tool longitudinally of the spindle, means comprising a cylinder and a longitudinally movable piston therein operatively connected to the spindle for rotating the same, and means including a valve operative in timed relation with the said reciprocation for controlling the fluid pressure in the said cylinder whereby the piston is moved longitudinally through a predetermined distance to index the spindle through a predetermined angle.

8. In combination, a work spindle, a rotary tool adapted to engage a work piece carried by the spindle, means providing a relative reciprocation between the spindle and tool longitudinally of the spindle, means comprising a cylinder and a longitudinally movable piston therein operatively connected to the spindle for rotating the same, locking means for preventing rotation of the spindle in either direction, and means including fluid pressure controlling mechanism operative in timed relation with the said reciprocation whereby the locking means is first disengaged and the piston thereafter moved longitudinally through a predetermined distance to index the spindle through a predetermined angle.

9. In combination, a work spindle, a rotary tool adapted to engage a work piece carried by the spindle, means providing a relative reciprocation between the spindle and tool longitudinally of the spindle, a pinion on the spindle, a toothed rack operatively connected to the pinion, means including a cylinder and a piston therein operatively connected to the rack, a latch for locking the spindle against rotation, and means including fluid pressure controlling mechanism operative in timed relation with the said reciprocation whereby the latch is first withdrawn and the piston and rack thereafter moved longitudinally a predetermined distance to index the spindle through a predetermined angle.

10. In combination, a work spindle, a rotary tool adapted to engage a work piece carried by the spindle, means providing a relative reciprocation between the spindle and tool longitudinally of the spindle, a pinion on the spindle, a toothed rack operatively connected to the pinion, means including a cylinder and a piston therein operatively connected to the rack to move the same in one direction, adjustable means for limiting the movement of the piston in the said direction, resilient means for moving the rack in the opposite direction, locking means for preventing rotation of the spindle, and means including fluid pressure controlling mechanism operative in timed relation with the said reciprocation whereby the locking means is first disengaged and the piston and rack thereafter moved longitudinally through a predetermined distance to index the spindle through a predetermined angle.

11. In combination, a work spindle, a rotary tool adapted to engage a work piece carried by the spindle, means providing a relative reciprocation between the spindle and tool longitudinally of the spindle, locking means for preventing rotation of the spindle in either direction, fluid pressure operated means including a piston operatively connected to the spindle for indexing the same, a pair of valves for respectively controlling the locking means and the piston, and means for operating the valves in timed relation with the said reciprocation whereby the locking means is first disengaged and the piston thereafter moved through a predetermined distance to index the spindle through a predetermined angle.

12. In combination, a plurality of work spindles, a plurality of rotatable tools adapted respectively to engage work pieces carried by the spindles, means providing a relative reciprocation between the spindles and tools longitudinally of the spindles, a pinion mounted on each spindle, a toothed rack meshing with all of said pinions, and means operative in timed relation with the said reciprocation whereby the rack is moved longitudinally through a predetermined distance to index the spindles through a predetermined angle.

13. In combination, a plurality of work spindles, a plurality of rotatable tools adapted respectively to engage work pieces carried by the spindles, means providing a relative reciprocation between the spindles and tools longitudinally of the spindles, a pinion mounted on each spindle, a toothed rack meshing with all of said pinions, locking means for preventing rotation of the spindles in either direction, and means operative in timed relation with the said reciprocation whereby the locking means is first disengaged from the spindles and the rack thereafter moved through a predetermined distance to index the spindles through a predetermined angle.

14. In combination, a plurality of work spindles, a plurality of rotatable tools adapted respectively to engage work pieces carried by the spindles, means providing a relative reciprocation between the spindles and tool longitudinally of the spindles, rack and pinion means for simultaneously rotating all the spindles, a locking latch engaging each spindle for preventing the rotation thereof in either direction, and means operative in timed relation with the said reciprocation whereby all the said latches are first withdrawn and the rack thereafter moved through a predetermined distance to index the spindles through a predetermined angle.

15. In combination, a plurality of work spindles, a plurality of rotatable tools adapted respectively to engage work pieces carried by the spindles, means providing a relative reciprocation between the spindles and tools longitudinally of the spindles, a pinion mounted on each spindle, a toothed rack meshing with all of said pinions, a locking latch engaging each spindle for preventing the rotation thereof in either direction, and means operative in timed relation with the said reciprocation whereby all the said latches are first withdrawn and the rack thereafter moved through a predetermined distance to index the spindles through a predetermined angle.

16. In combination, a plurality of work spindles, a plurality of rotatable tools adapted respectively to engage work pieces carried by the spindles, means providing a relative reciprocation between the spindles and tools longitudinally of the spindles, locking means for preventing rotation of the spindles in either direction, fluid pressure operated means including a piston operatively connected to the spindles for simultaneously indexing the same, and means including fluid pressure controlling mechanism operative in timed relation with the said reciprocation whereby the locking means is first disengaged and the piston thereafter moved through a predetermined distance to index the spindles through a predetermined angle.

17. In combination, a plurality of work spindles, a plurality of rotatable tools adapted respectively to engage work pieces carried by the spindles, means providing a relative reciprocation between the spindles and tools longitudinally of the spindles, a locking latch engaging each spindle for preventing the rotation thereof in either direction, fluid pressure operated means including a piston operatively connected to the spindles for simultaneously indexing the same, and means including fluid pressure controlling mechanism operative in timed relation with the said reciprocation whereby the latches are first withdrawn and the piston thereafter moved through a predetermined distance to index the spindles through a predetermined angle.

18. In combination, a plurality of work spindles, a plurality of rotatable tools adapted respectively to engage work pieces carried by the spindles, means providing a relative reciprocation between the spindles and tools longitudinally of the spindles, a pinion mounted on each spindle, a toothed rack operatively connected to all of said pinions, locking means for preventing rotation of the spindles, a cylinder, a longitudinally movable piston therein operatively connected to the rack, and means including fluid pressure controlling mechanism operative in timed relation with the said reciprocation whereby the locking means is first disengaged and the piston thereafter moved longitudinally through a predetermined distance to index the spindles through a predetermined angle.

19. In a machine of the class described, the combination of a work table, means for reciprocating the table, a plurality of work spindles rotatably mounted on the table, a plurality of rotary tools adapted respectively to engage work pieces carried by the spindles, means including a longitudinally movable fluid operated piston for indexing the spindles, and means operated in timed relation with the table reciprocation for controlling the fluid pressure to the piston whereby the spindles are indexed through a desired angle at each reciprocation of the table.

20. In a machine of the class described, the combination of a work table, means for reciprocating the table, a plurality of work spindles rotatably mounted on the table, a plurality of rotary tools adapted respectively to engage work pieces carried by the spindles, locking means for preventing rotation of the spindles in either direction, fluid pressure operated means including a piston operatively connected to the spindles for simultaneously indexing the same, and means including fluid pressure controlling mechanism operated by the table reciprocation whereby the locking means is first disengaged and the piston thereafter moved through a predetermined distance to index the spindles through a predetermined angle.

21. In a machine of the class described, the combination of a work table, means for reciprocating the table, a plurality of work spindles rotatably mounted on the table, a plurality of rotary tools adapted respectively to engage work pieces carried by the spindles, releasable latch means for preventing rotation of the spindles, fluid operated piston means for releasing the latch means, means comprising a longitudinally movable fluid operated piston operatively connected to the spindles for indexing the same, and valve means operated by the table reciprocation whereby the latch means is first disengaged and the last named piston thereafter moved through a predetermined distance to index the spindles through a predetermined angle.

22. In a machine of the class described, the combination of a work table, means for reciprocating the table, a plurality of work spindles rotatably mounted on the table, a plurality of rotary tools adapted respectively to engage work pieces carried by the spindles, releasable latch means for preventing rotation of the spindles, fluid operated piston means for releasing the latch means, a pinion on each spindle, a rack operatively connected to the pinions, a longitudinally movable fluid operated piston operatively connected to the rack, adjustable means for limiting the movement of the piston in the spindle indexing direction, and valve means operated by the table reciprocation whereby the latch means is first disengaged and the last named piston thereafter moved through a predetermined distance to index the spindles through a predetermined angle.

23. In a machine of the class described, the combination of a work table, means for reciprocating the table, a work spindle rotatably mounted on the table, a rotary tool adapted to engage a work piece carried by the spindle, a releasable latch for preventing rotation of the spindle, a fluid operated piston for releasing the latch, a fluid operated piston operatively connected to the spindle for indexing the same, a pair of valves connected together for simultaneous movement and adapted respectively to control the fluid pressure to the said two pistons, and a rod moved by the table and adapted to move the valves whereby fluid pressure is first admitted to the latch releasing piston and thereafter admitted to the indexing piston.

24. In a machine of the class described, the combination of a work table, means for reciprocating the table, a work spindle rotatably mounted on the table, a rotary tool adapted to engage a work piece carried by the spindle, a releasable latch for preventing rotation of the spindle, a fluid operated piston for releasing the latch, a fluid operated piston operatively connected to the spindle for indexing the same, a pair of rotary valves geared together and adapted respectively to control fluid pressure to the said two pistons, an arm extending from each valve, and a rod moved by the table and adapted to engage one arm and move the valves whereby fluid pressure is first admitted to the latch releasing piston and thereafter admitted to the indexing piston, the rod by its continued movement in the same direction thereafter engaging the other arm and moving the valves to their original position.

In testimony whereof, we hereto affix our signatures.

CHARLES A. FISHER.
WILLIAM MacPHERSON.